(12) United States Patent
Lee et al.

(10) Patent No.: US 10,198,170 B2
(45) Date of Patent: Feb. 5, 2019

(54) MOBILE TERMINAL AND CONTROL METHOD THEREFOR

(71) Applicant: LG ELECTRONICS INC., Seoul (KR)

(72) Inventors: Sanghyun Lee, Seoul (KR); Jonghwa Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 80 days.

(21) Appl. No.: 15/118,352

(22) PCT Filed: Feb. 12, 2014

(86) PCT No.: PCT/KR2014/001160
§ 371 (c)(1),
(2) Date: Aug. 11, 2016

(87) PCT Pub. No.: WO2015/122551
PCT Pub. Date: Aug. 20, 2015

(65) Prior Publication Data
US 2017/0168693 A1    Jun. 15, 2017

(51) Int. Cl.
*G06F 3/048* (2013.01)
*G06F 3/0484* (2013.01)
*G06F 3/0488* (2013.01)
*G06F 3/0486* (2013.01)

(52) U.S. Cl.
CPC ........ *G06F 3/04847* (2013.01); *G06F 3/0486* (2013.01); *G06F 3/0488* (2013.01); *G06F 3/04883* (2013.01); *G06F 2203/04803* (2013.01); *G06F 2203/04806* (2013.01)

(58) Field of Classification Search
None
See application file for complete search history.

(56) References Cited

U.S. PATENT DOCUMENTS

| | | | |
|---|---|---|---|
| 8,351,983 B2* | 1/2013 | Kim | H04N 9/3173 345/1.1 |
| 9,367,227 B1* | 6/2016 | Kim | G06F 3/04883 |
| 2011/0244924 A1* | 10/2011 | Jung | G06F 3/0481 455/566 |

(Continued)

FOREIGN PATENT DOCUMENTS

| | | |
|---|---|---|
| KR | 10-2009-0023928 | 3/2009 |
| KR | 10-2010-0137861 | 12/2010 |

(Continued)

OTHER PUBLICATIONS

PCT International Application No. PCT/KR2014/001160, Written Opinion of the International Searching Authority dated Nov. 10, 2014, 20 pages.

*Primary Examiner* — Hua Lu
(74) *Attorney, Agent, or Firm* — Lee, Hong, Degerman, Kang & Waimey

(57) ABSTRACT

The present invention relates to a mobile terminal which can be used as a terminal for which user convenience has been further considered and a control method therefor. According to at least one of the embodiments of the present invention, even if the terminal is provided with a touch screen having a relatively small area, a method for efficiently controlling the terminal can be provided.

8 Claims, 10 Drawing Sheets

(56) References Cited

U.S. PATENT DOCUMENTS

| | | | |
|---|---|---|---|
| 2012/0026290 A1* | 2/2012 | Lim | G06T 19/006 348/46 |
| 2012/0110501 A1* | 5/2012 | Baek | G06F 3/0481 715/800 |
| 2012/0240071 A1* | 9/2012 | Park | G06F 3/0488 715/769 |
| 2012/0296212 A1* | 11/2012 | Hamada | A61B 8/0858 600/443 |
| 2012/0327106 A1* | 12/2012 | Won | G06F 3/04883 345/619 |
| 2013/0285964 A1* | 10/2013 | Kang | G06F 3/044 345/173 |
| 2014/0089832 A1* | 3/2014 | Kim | G06F 3/0481 715/769 |
| 2014/0164993 A1* | 6/2014 | Chang | G06F 3/0485 715/800 |
| 2014/0176600 A1* | 6/2014 | Lee | G09B 21/008 345/625 |
| 2014/0250406 A1* | 9/2014 | Seo | G06F 3/0488 715/781 |
| 2015/0026590 A1* | 1/2015 | Shirzadi | G06F 3/017 715/751 |
| 2015/0046884 A1* | 2/2015 | Moore | G06F 3/0481 715/863 |
| 2015/0097869 A1* | 4/2015 | Oh | G06T 7/0012 345/635 |
| 2015/0098653 A1* | 4/2015 | Akashi | G06K 9/00402 382/189 |
| 2015/0113455 A1* | 4/2015 | Kang | G06F 3/04842 715/765 |
| 2015/0130759 A1* | 5/2015 | Heo | B60K 35/00 345/174 |
| 2015/0325211 A1* | 11/2015 | Lee | G06F 3/0481 345/1.3 |
| 2015/0339035 A1* | 11/2015 | Lei | G06F 3/04883 715/765 |
| 2016/0288643 A1* | 10/2016 | Kotter | G06F 3/0488 |

FOREIGN PATENT DOCUMENTS

| | | |
|---|---|---|
| KR | 10-2011-0010522 | 2/2011 |
| KR | 10-2013-0090467 | 8/2013 |

* cited by examiner (a)   (b)

Mobile Terminal and Control Method Therefor

CROSS-REFERENCE TO RELATED APPLICATIONS

This application is the National Stage filing under 35 U.S.C. 371 of International Application No. PCT/KR2014/001160, filed on Feb. 12, 2014, the contents of which are all hereby incorporated by reference herein in their entirety.

TECHNICAL FIELD

The present invention relates to a mobile terminal and controlling method thereof, suitable for implementing the terminal to be used in further consideration of user's convenience.

BACKGROUND ART

Terminals may be generally classified as mobile/portable terminals or stationary terminals according to their mobility. Mobile terminals may also be classified as handheld terminals or vehicle mount terminals according to whether or not a user can directly carry the terminal.

As functions of the terminal are getting diversified, terminal tends to be implemented as a multimedia player provided with composite functions such as photographing of photos or videos, playback of music or video files, game play, broadcast reception and the like for example.

To support and enhance such terminal functions, structural and/or software parts may consider being improved.

A user input means for controlling such a mobile terminal mainly uses a touchscreen. Since the touchscreen is equipped with both an output means and an input means, it is considerably advantageous in providing a user with an intuitive controlling method. The reason why the controlling method through the touchscreen is intuitive is that the mobile terminal can be controlled in a manner of outputting icons indicating control commands providable to a user and then touching the corresponding icons.

However, such a controlling method using a touchscreen is disadvantageous in that an icon corresponding to each control command should be outputted to a screen, whereas the method is advantageous in being intuitive. Thus, if the number of control commands supposed to be inputted from a user increases, the number of icons outputted to a touchscreen increases as well. Hence, the touchscreen may not be able to sufficiently play a role as an output means. Moreover, as the development of wearable devices tends to be accelerated and a touchscreen provided to such a wearable device is relatively small, the above-mentioned controlling method is not appropriate. In particular, the above-mentioned method of controlling the mobile terminal using the touchscreen may hinder a touchscreen function as an output means.

Thus, the demand for researching & developing various mobile terminal controlling methods implemented through a touchscreen is rising.

DISCLOSURE OF THE INVENTION

Technical Task

Accordingly, the present invention is directed to substantially obviate one or more problems due to limitations and disadvantages of the related art. And, one technical task of the present invention is to a mobile terminal and controlling method thereof, by which a prescribed function can be performed based on a touch drag input.

Technical tasks obtainable from the present invention are non-limited by the above-mentioned technical task. And, other unmentioned technical tasks can be clearly understood from the following description by those having ordinary skill in the technical field to which the present invention pertains.

Technical Solutions

In one technical aspect of the present invention, provided herein is a mobile terminal, including a touchscreen configured to sense a touch input and/or a touch drag input from a user and a controller configured to control the touchscreen to output a display object, wherein if the sensed touch drag input is a split touch drag of partitioning the outputted display object into two regions, the controller is further configured to perform a prescribed function corresponding to the split touch drag.

Preferably, the display object includes a text message notification object indicating a reception of a text message and the prescribed function includes a function of outputting details of the text message.

Preferably, the display object includes a message output object configured to output details of a received text message and the prescribed function includes a function of deleting the received text message.

Preferably, the display object includes a data output object configured to output prescribed data and the prescribed function includes a function of enlarging and outputting partial data selected from the outputted prescribed data.

More preferably, the controller identifiably outputs two regions of the data output object partitioned based on the split touch drag and the selected partial data includes data corresponding to a user-touched one of the identifiably outputted two regions.

More preferably, the selected partial data includes data corresponding to a smaller one of the identifiably outputted two regions in size.

In this case, the prescribed data includes map data and an enlargement ratio of the partial data is determined based on a size ratio of the two regions.

In another technical aspect of the present invention, provided herein is a method of controlling a mobile terminal, including the steps of sensing a touch input and/or a touch drag input from a user, controlling a touchscreen to output a display object, and if the sensed touch drag input is a split touch drag of partitioning the outputted display object into two regions, performing a prescribed function corresponding to the split touch drag.

Preferably, the display object includes a text message notification object indicating a reception of a text message and the prescribed function includes a function of outputting details of the text message.

Preferably, the display object includes a message output object configured to output details of a received text message and the prescribed function includes a function of deleting the received text message.

Preferably, the display object includes a data output object configured to output prescribed data and the prescribed function includes a function of enlarging and outputting partial data selected from the outputted prescribed data.

More preferably, the method further includes the step of identifiably outputting two regions of the data output object partitioned based on the split touch drag, and the selected partial data includes data corresponding to a user-touched one of the identifiably outputted two regions.

More preferably, the selected partial data includes data corresponding to a smaller one of the identifiably outputted two regions in size.

In this case, the prescribed data includes map data and an enlargement ratio of the partial data is determined based on a size ratio of the two regions.

Advantageous Effects

Effects of a mobile terminal and controlling method thereof according to the present invention are described as follows.

According to at least one of embodiments of the present invention, a mobile terminal can be advantageously controlled using a simple and convenient touch input.

According to at least one of embodiments of the present invention, a controlling method suitable for a wearable device can be provided.

Effects obtainable from the present invention may be non-limited by the above mentioned effect. And, other unmentioned effects can be clearly understood from the following description by those having ordinary skill in the technical field to which the present invention pertains.

BEST MODE FOR INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
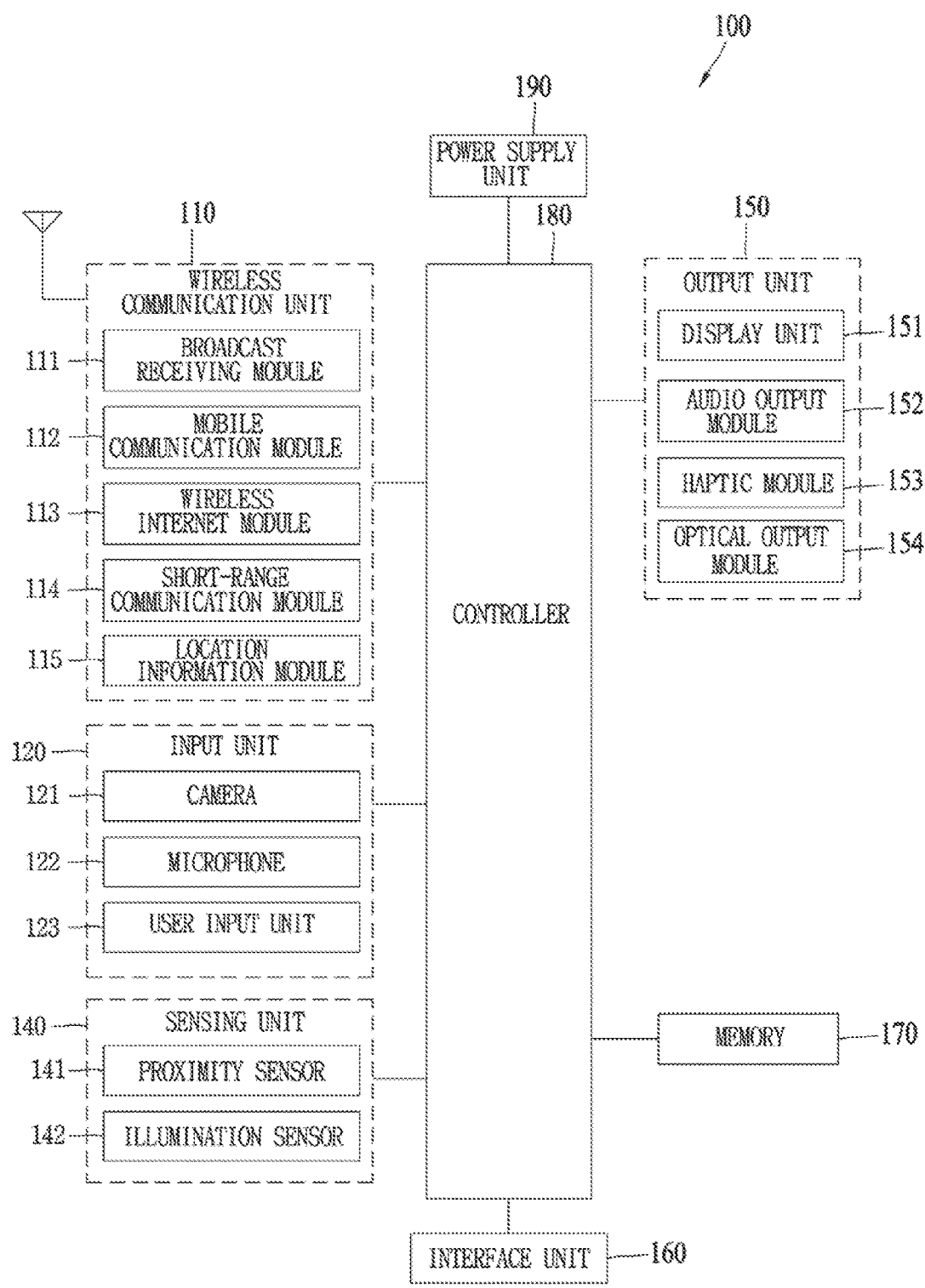
FIG. 1A is a block diagram of a mobile terminal in accordance with the present disclosure.
Figure 1B:
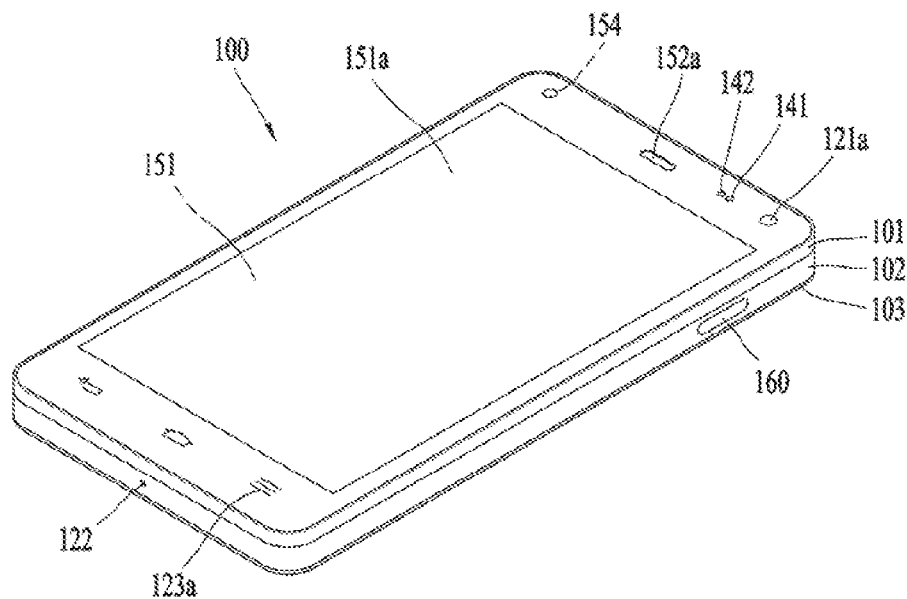
FIGS. 1B and 1C are conceptual views of one example of the mobile terminal, viewed from different directions.
Figure 1C:
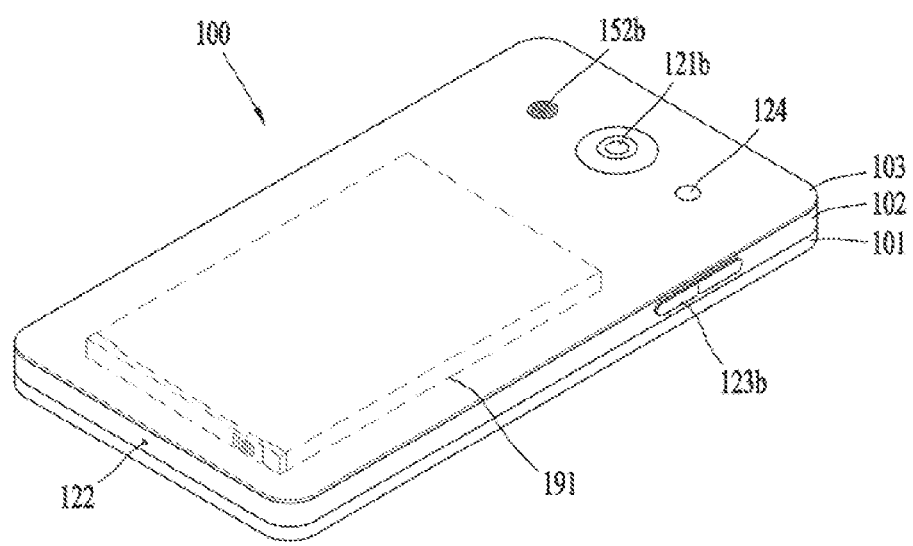

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170.

As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Some elements among the above discussed elements can be combined with following embodiments. Furthermore, the control or the function of the mobile terminal performs based on at least one programs stored in the memory (170).

Referring still to FIG. 1A, various components depicted in this figure will now be described in more detail.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like.

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof.

Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151*a* of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121*b* or an audio output module 152*b*.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151*a* and the front case 101, between the front case 101 and the rear case 102, or between the rear case 102 and the rear cover 103, to hermetically seal an inner space when those cases are coupled.

The mobile terminal (100) can include the display (151), the first audio output module (152*a*), the second audio output module (152*b*), proximity sensor 141, illumination sensor 142, optical output module 154, first and second cameras (121*a*, 121*b*), first and second manipulation units (123*a* and 123*b*), microphone 122, and the interface unit 160.

FIGS. 1B and 1C depict certain components as arranged on the mobile terminal.

However, it is to be understood that alternative arrangements are possible and within the teachings of the instant disclosure. Some components may be omitted or rearranged. For example, the first manipulation unit 123*a* may be located on another surface of the terminal body, and the second audio output module 152*b* may be located on the side surface of the terminal body.

The display unit 151 outputs information processed in the mobile terminal 100. The display unit 151 may be implemented using one or more suitable display devices.

Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151*a* and a display on a rear surface of the window 151*a*, or a metal wire which is patterned directly on the rear surface of the window 151*a*. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123*a*.

The first audio output module 152*a* may be implemented in the form of a speaker to output voice audio, alarm sounds, multimedia audio reproduction, and the like.

The window 151*a* of the display unit 151 will typically include an aperture to permit audio generated by the first audio output module 152*a* to pass. One alternative is to allow audio to be released along an assembly gap between the structural bodies (for example, a gap between the window 151*a* and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body.

The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

The mobile terminal can be applied to a wearable device. For example, the wearable device can be a smart watch, a smart glass, a HMD (head mounted display).

The wearable device can exchange data with another mobile terminal (100). The short-range communication module 114 can sense (or recognize) the wearable device near to the mobile terminal (100). If the sensed (recognized) wearable device is confirmed, the controller (180) controls the short-range communication module (114) to transmit data processed by the mobile terminal (100) to the wearable device. Thus, the user can see the data processed by the mobile terminal (100) by using the wearable device. For example, even though a call is received via the mobile terminal (100), the user can answer the phone by using the wearable device, not the mobile terminal (100). For example, even though a message is received via the mobile terminal (100), the user can see the message by using the wearable device, not the mobile terminal (100).

Figure 2:
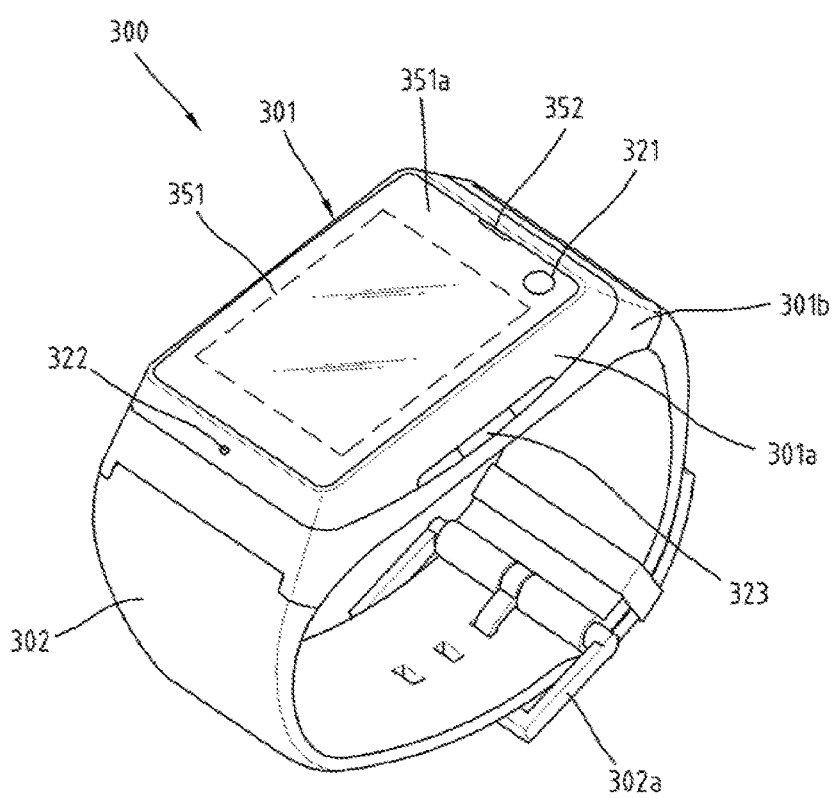
FIG. 2 is a perspective diagram of a watch-type mobile terminal 300 related to another embodiment of the present invention.

FIG. 2 is a perspective diagram of a watch-type mobile terminal 300 related to another embodiment of the present invention.

Referring to FIG. 2, the watch-type mobile terminal 300 includes a main body 301 with a display unit 351 and a band 302 connected to the main body 301 to be wearable on a wrist.

The main body 301 may include a case having a certain appearance. As illustrated, the case may include a first case 301a and a second case 301b cooperatively defining an inner space for accommodating various electronic components. Other configurations are possible. For instance, a single case may alternatively be implemented, with such a case being configured to define the inner space, thereby implementing a mobile terminal 300 with a uni-body.

The watch-type mobile terminal 300 can perform wireless communication, and an antenna for the wireless communication can be installed in the main body 301. The antenna may extend its function using the case. For example, a case including a conductive material may be electrically connected to the antenna to extend a ground area or a radiation area.

The display unit 351 is shown located at the front side of the main body 301 so that displayed information is viewable to a user. In some embodiments, the display unit 351 includes a touch sensor so that the display unit can function as a touchscreen. As illustrated, a window 351a of the display unit 351 is positioned on the first case 301a to form a front surface of the terminal body together with the first case 301a.

An audio output module 352, a camera 321, a microphone 322, a user input unit 323 and the like can be positioned on the main body 301. When the display unit 351 is implemented as a touchscreen, it may function as the user input unit 323, whereby a spate key may not be provided to the main body 301.

The band 302 is commonly worn on the user's wrist and may be made of a flexible material for facilitating wearing of the device. As one example, the band 302 may be made of fur, rubber, silicon, synthetic resin, or the like. The band 302 may also be configured to be detachable from the main body 301. Accordingly, the band 302 may be replaceable with various types of bands according to a user's preference.

In one configuration, the band 302 may be used for extending the performance of the antenna. For example, the band may include therein a ground extending portion (not shown) electrically connected to the antenna to extend a ground area.

The band 302 may include a fastener 302a. The fastener 302a may be implemented into a buckle type, a snap-fit hook structure, a Velcro® type, or the like, and include a flexible section or material. The drawing illustrates an example that the fastener 302a is implemented using a buckle.

Description of embodiments related to a controlling method implementable in the above-configured mobile terminal will now be given in detail with reference to the accompanying drawings.

Compared with a general terminal, a wearable device such as the above watch-type mobile terminal 300 may have a display 151 (or touchscreen) of a relatively small size. Since the wearable device should be worn on user's body, the size of the display unit 151 is limited.

A controlling method of a mobile terminal 100 used in general has difficulty in applying to such a wearable device. Namely, since a method of controlling the mobile terminal 100 is mostly implemented through the touchscreen 151, it is useful only if a size of the touchscreen 151 needs to be greater than a prescribed size. Hence, according to one embodiment of the present invention, it is intended to propose an effective controlling method through the touchscreen of a small size.

Generally, touch input types inputtable through the touchscreen 151 are limited. Such types may include an input of touching the touchscreen 151 once, an input of touching the touchscreen 151 plural times in a prescribed time, an input of touching the touchscreen 151, maintaining the touch over prescribed duration, and then releasing the touch, an input of touching the touchscreen 151 and then dragging the touch (i.e., touch drag input), and the like. According to one embodiment of the present invention, it is proposed to launch a prescribed function if the touch drag input meets a prescribed condition.

According to one embodiment of the present invention, the prescribed condition is proposed as follows. First of all, while a prescribed display object is outputted through the touchscreen 151, the prescribed condition is determined as whether a touch path of the touch drag input splits the outputted display object into two regions. In particular, according to one embodiment of the present invention, if a sensed touch drag input splits an outputted display object into two regions, it is proposed the controller 180 to launch a prescribed function. In the following description of embodiments of the present invention, a touch drag input configured to split a display object outputted through the touchscreen 151 into two regions shall be named a split touch drag input.

The following embodiments of the present invention are described on the basis of the general mobile terminal 100 or the watch-type mobile terminal 300, by which types of terminals are non-limited.

Figure 3:
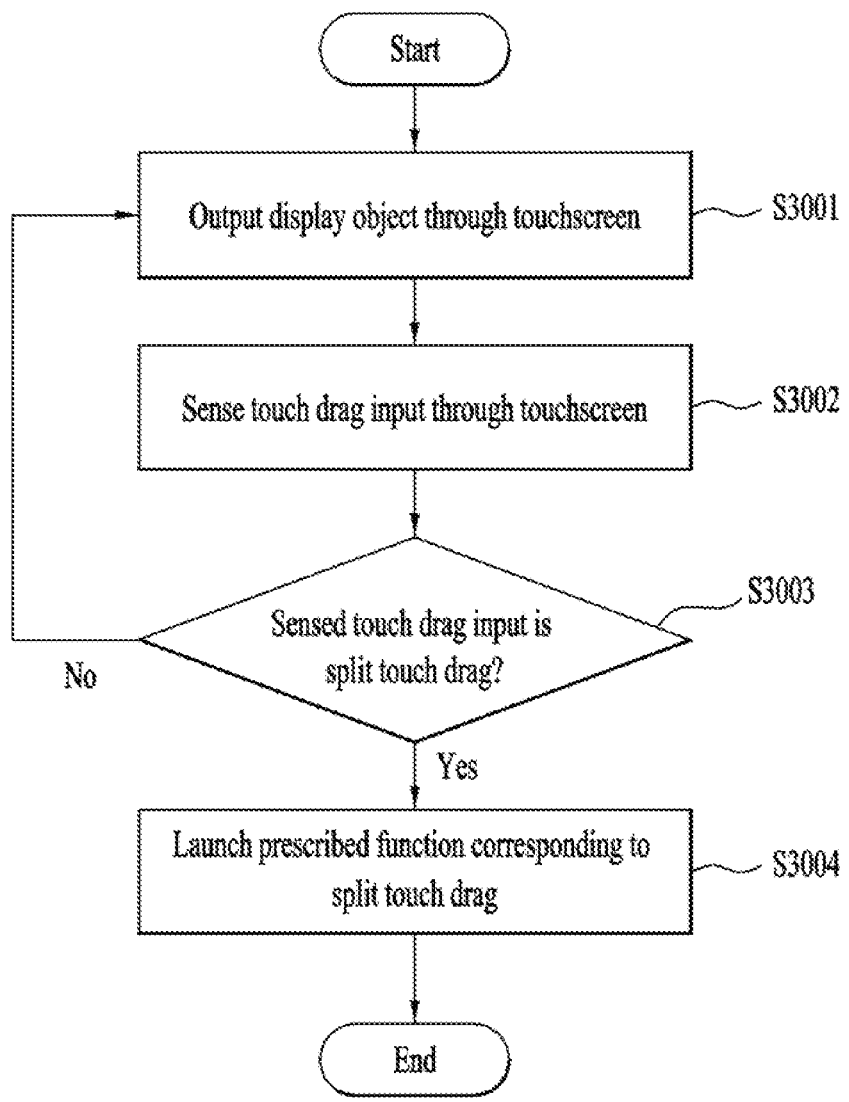
FIG. 3 is a flowchart of a controlling method for performing a prescribed function depending on whether a touch drag input meets a prescribed condition according to one embodiment of the present invention.
Figure 4:
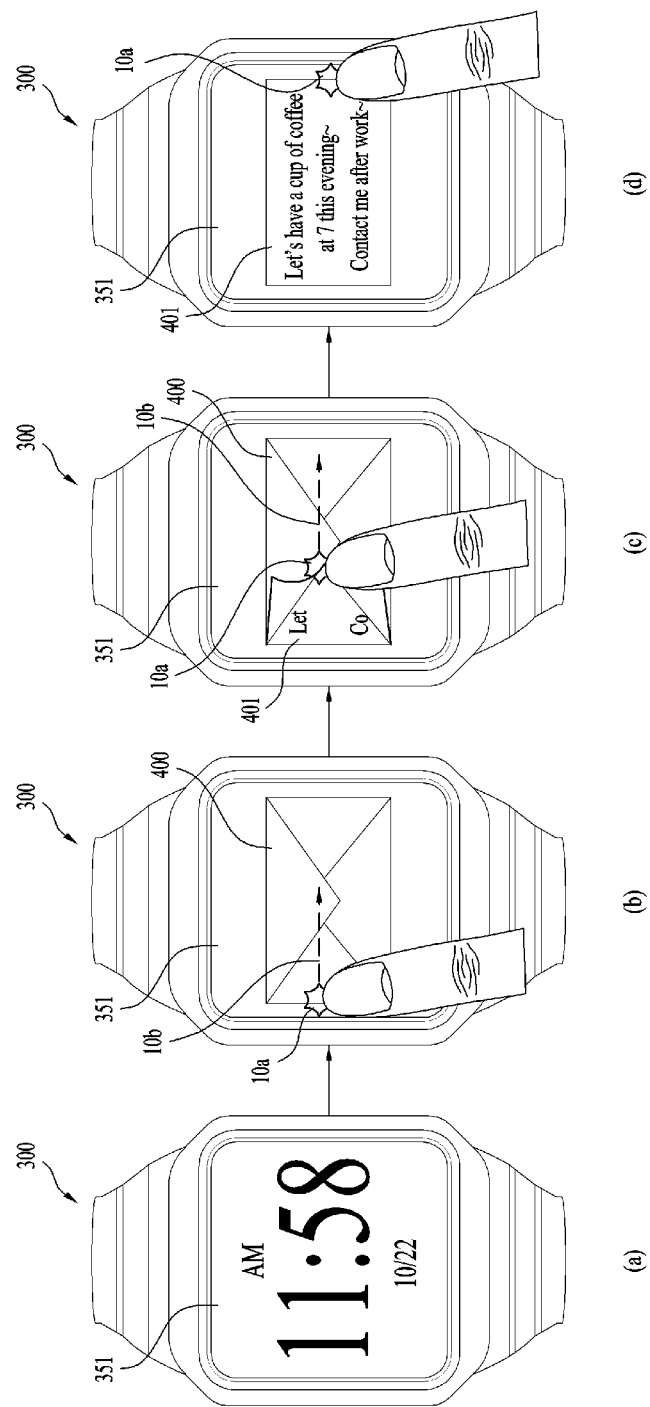
FIG. 4 is a diagram of a controlling method for performing a prescribed function depending on whether a touch drag input meets a prescribed condition according to one embodiment of the present invention.

FIG. 3 is a flowchart of a controlling method for performing a prescribed function depending on whether a touch drag input meets a prescribed condition according to one embodiment of the present invention. FIG. 4 is a diagram of a controlling method for performing a prescribed function depending on whether a touch drag input meets a prescribed condition according to one embodiment of the present invention. The description with reference to FIG. 4 is made by taking the watch-type mobile terminal 300 as one example, by which the present invention is non-limited. The following description is made with reference to FIG. 3 and FIG. 4 together.

Referring to FIG. 4 (*a*), the display unit 351 of the watch-type mobile terminal 300 is standing by. In the embodiments of the present invention, the display unit 351 shall be described as a touchscreen for example and called a touchscreen hereinafter.

In a step S3001, the controller 180 can output a display object 400 through the touchscreen 351 [refer to FIG. 4 (*b*)]. According to the example shown in FIG. 4, the display object 400 is a notification object corresponding to a reception of a text message. In a step S3002, the controller 180 senses a touch drag input received through the touchscreen 351. As shown in FIG. 4 (*b*), the touch drag input may include an input of applying a touch 10*a* to the touchscreen 351 and then performing a drag 10*b* by maintaining the touch 10*a*.

In a step S3003, the controller 180 determines whether the touch drag input 10*a* and 10*b* is a split touch drag input. As mentioned in the foregoing description, whether the touch drag input is the split touch drag input can be determined based on whether a touch path of the touch drag input splits the outputted display object into two regions. If the touch drag input is not the split touch drag input, the controller 180 can go back to the step S3001. If determining the split touch drag input, the controller 180 can go to a step S3004. In the step S3004, the controller 180 can launch a prescribed function corresponding to the split touch drag input.

According to the example shown in FIG. 4, the prescribed function may include a function of outputting details 401 of the received text message.

Meanwhile, according to one embodiment of the present invention, as shown in FIG. 4 (*c*), in response to the touch drag input, it may be able to output an animation effect as if the notification object is split along a touch drag path.

Recently, in case of touching the touchscreen 151 with a finger, a technology of performing both fingerprint recognition of the finger and detection of a touch input has been developed. According to one embodiment of the present invention, in performing a function of outputting the details 401 of the text message, it is further proposed to consider whether a preset fingerprint is recognized. In particular, only if the preset fingerprint is sensed, it is able to control the prescribed function to be launched. Since a text message includes strongly personal data, it is able to restrict the person not directly concerned from viewing the corresponding text.

Meanwhile, according to the embodiment described with reference to FIG. 4, in response to a split touch drag input to a text notification object, a function of outputting details of a text message is launched. And, other various functions may be further applicable. Various functions to which the embodiment of the present invention is applicable are described in sequence with reference to the accompanying drawings.

Figure 5:
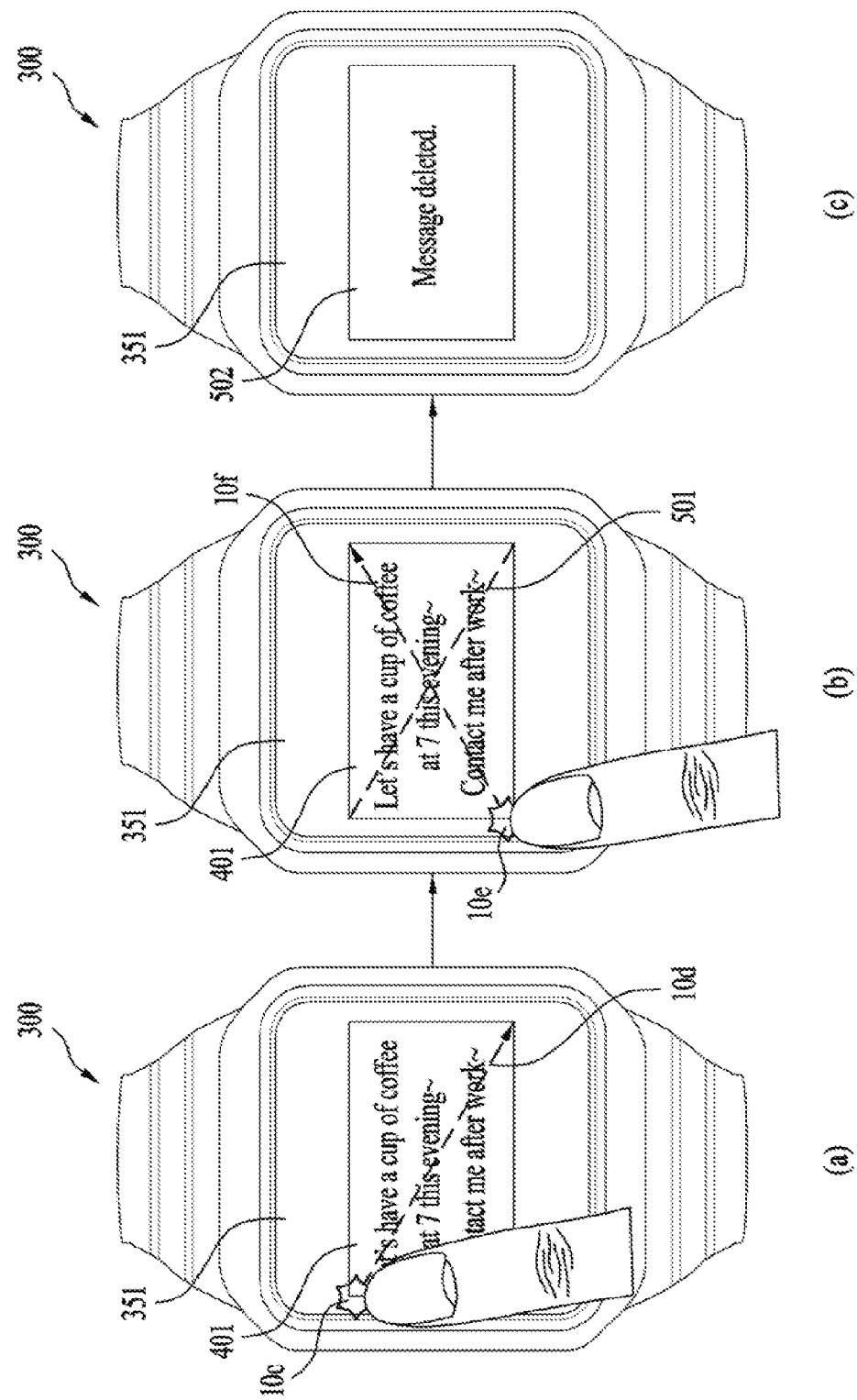
FIG. 5 is a diagram of a controlling method for deleting a message in response to a touch drag input according to one embodiment of the present invention.

FIG. 5 is a diagram of a controlling method for deleting a message in response to a touch drag input according to one embodiment of the present invention.

Referring to FIG. 5 (*a*), a watch-type mobile terminal 300 is outputting details (hereinafter named message output object) 401 of a text message through a touchscreen 351. The message output object 401 may be outputted by the controlling method described with reference to FIG. 4.

According to the example described with reference to FIG. 5, the controller 180 intends to propose a controlling method of deleting a message. As a touch drag input for deleting a message, two split touch drag inputs having touch paths crossing with each other are proposed. Since 'X' symbolically means 'cancel' or 'delete', if 'X' is marked, it is proposed to delete a message. Hence, a controlling method can be intuitively performed.

A touch path of a first split touch drag 10*c* and 10*d* shown in FIG. 5 (*a*) and a touch path of a second split touch drag 10*e* and 10*f* shown in FIG. 5 (*b*) cross with each other. In response to the first split touch drag and the second split touch drag, the watch-type mobile terminal 300 launches a prescribed function. According to the example shown in FIG. 5 (*c*), the prescribed function includes a function of deleting a message. As shown in FIG. 5 (*c*), the watch-type mobile terminal 300 deletes the message and is able to output a popup window 502 indicating the deletion of the message.

In the course of displaying prescribed data using the general touchscreen 151/351, a pinch-in/out touch is used as an input for enlarging/reducing a display of the prescribed data. Yet, in case of the above touch, an action of touching at least two points of the touchscreen 151/351 and then dragging the corresponding touches is required. Hence, such an action may not be appropriate for the touchscreen 151/351 of a relatively small size.

According to one embodiment of the present invention, in order to enlarge or reduce a portion of an outputted prescribed data, the above-described split touch drag input is proposed. Such an embodiment is described with reference to FIGS. 6 to 8.

Figure 6:
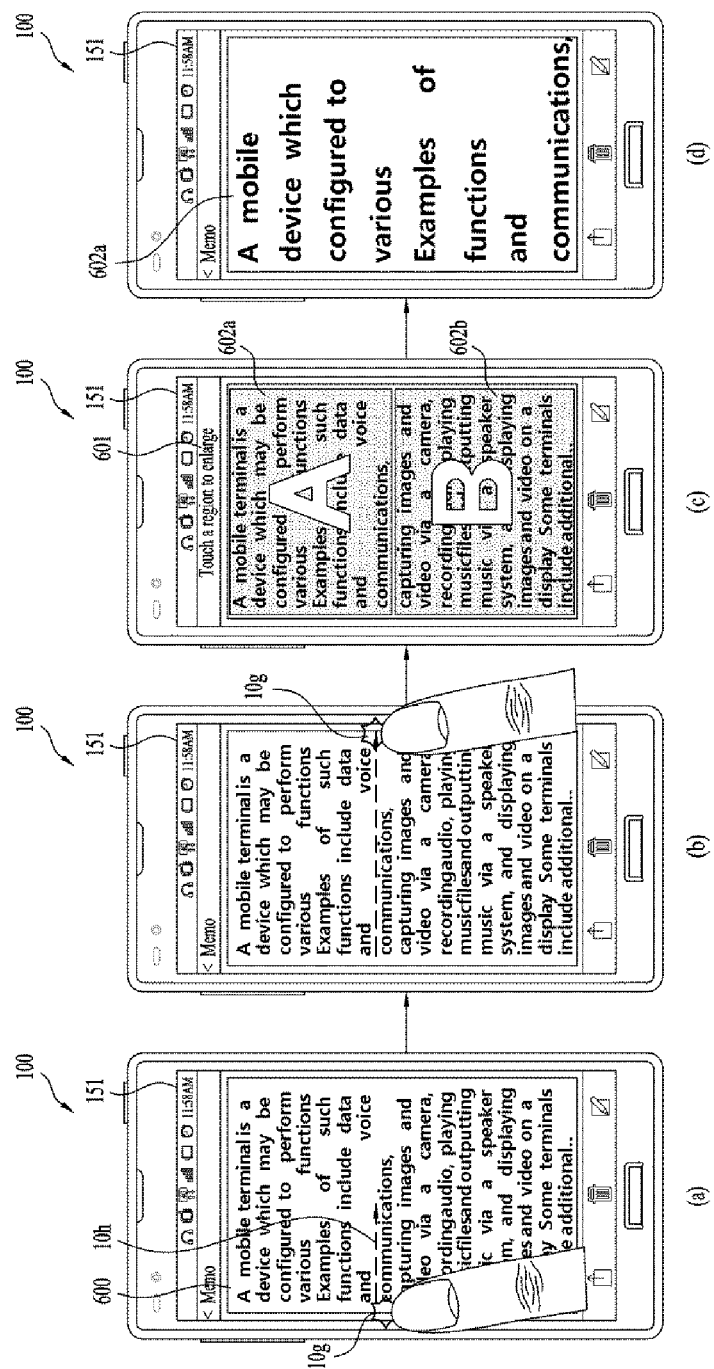
FIG. 6 is a diagram of a controlling method for dividing a region of a touchscreen currently outputting data into two regions based on a touch drag input, enlarging data outputted to one of the two regions, and then outputting the enlarged data according to one embodiment of the present invention.

FIG. 6 is a diagram of a controlling method for dividing a region of a touchscreen currently outputting data into two regions based on a touch drag input, enlarging data outputted to one of the two regions, and then outputting the enlarged data according to one embodiment of the present invention.

Referring to FIG. 6 (*a*), the controller 180 is outputting a state diagram of a memo application through the touchscreen 151. And, a content (hereinafter named a memo output object) 600 of previously saved memo data is currently outputted.

A split touch drag 10*g* and 10*h* is inputted onto the memo output object 600. The controller 180 can enlarge and display one of the contents of the memo data divided by a touch path of the split touch drag 10*g* and 10*h*.

For instance, if the split touch drag 10*g* and 10*h* is inputted, the controller 180 can divide the memo output object 600 into a region-A 602*a* and a region-B 602*b* with reference to a touch path. If an input for selecting one of the regions is received form a user, the controller 180 can enlarge and display the memo data corresponding to the selected region [refer to FIG. 6 (*d*)]. The input for selecting a prescribed region may include a touch input applied to a region intended to be selected from the region-A 602*a* and the region-B 602*b* into which the memo output object 600 was divided.

The state diagram shown in FIG. 6 (*d*) assumes that the region-A 602*a* is selected. Referring to FIG. 6 (*d*), memo data corresponding to the region-A 602*a* on the memo output object 600 is enlarged and displayed.

The controlling method in FIG. 6 requires an input for selecting one of regions divided by a touch drag. Yet, a controlling method for performing an enlargement operation without such a region selection is proposed with reference to FIG. 7 as follows.

Figure 7:
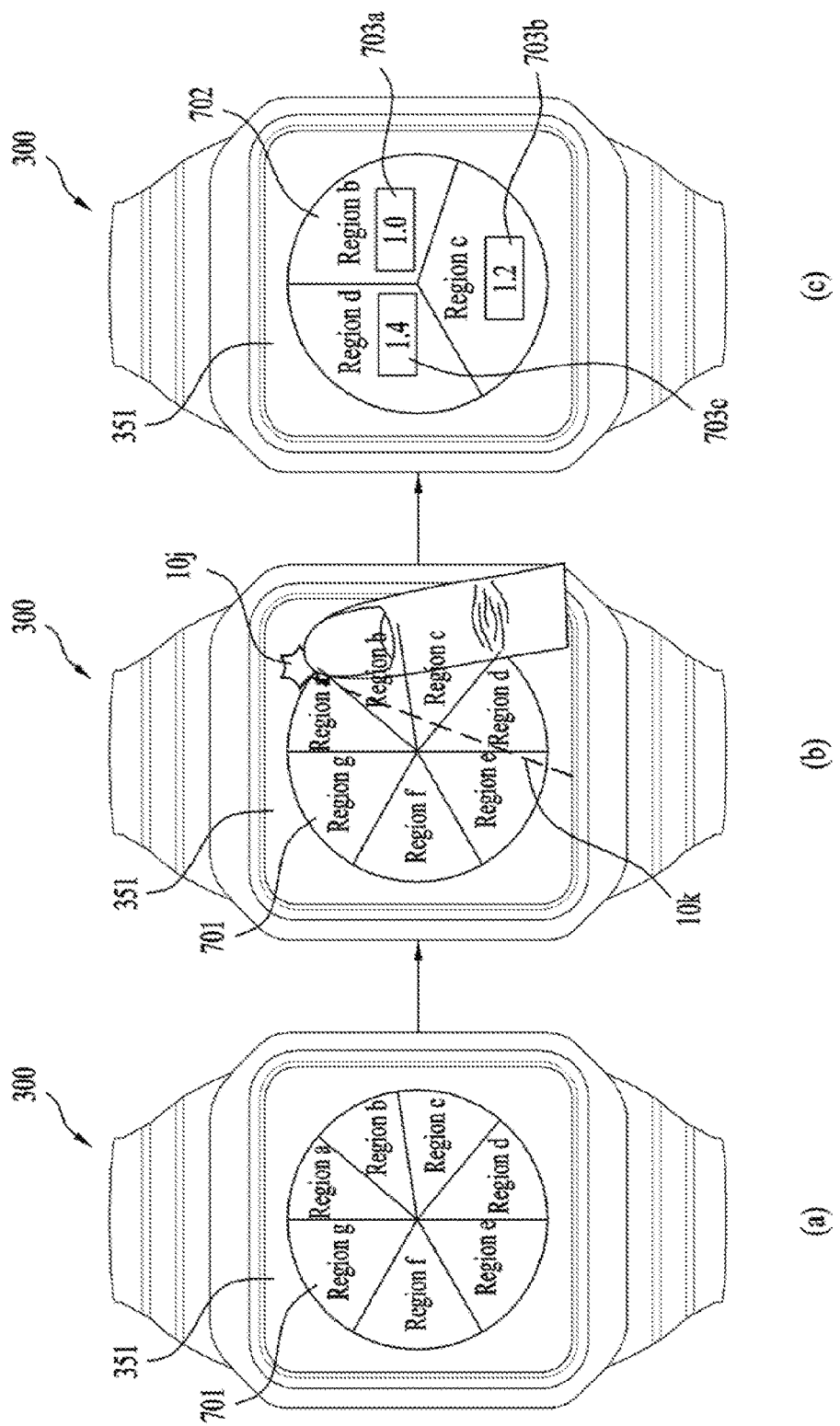
FIG. 7 is a diagram of a controlling method for enlarging and outputting chart data in response to a touch drag input according to one embodiment of the present invention.

FIG. 7 is a diagram of a controlling method for enlarging and outputting chart data in response to a touch drag input according to one embodiment of the present invention.

Referring to FIG. 7 (a), a plurality of numerical data are displayed through a circular chart object 701. If a split touch drag 10j and 10k is inputted onto the circular chart object, the controller 180 can enlarge and display a prescribed numerical data.

For instance, if an output of the numerical data on the circular chart object 701 is divided into two regions according to a touch path of the split touch drag 10j and 10k, the numerical data corresponding to one of the two regions can be enlarged and displayed. According to the example shown in FIG. 7 (c), the controller 180 enlarges and displays the numerical data corresponding to a smaller one of the two regions in size.

Referring to FIG. 7 (c), in enlarging and displaying the numerical data, the controller 180 can further display detailed numerical informations 703a to 703c of the numerical data.

The controlling method described with reference to FIG. 7 is applicable to data displays of various types as well as to the circular chart object. An embodiment applied to an output of map data is described with reference to FIG. 8.

Figure 8:
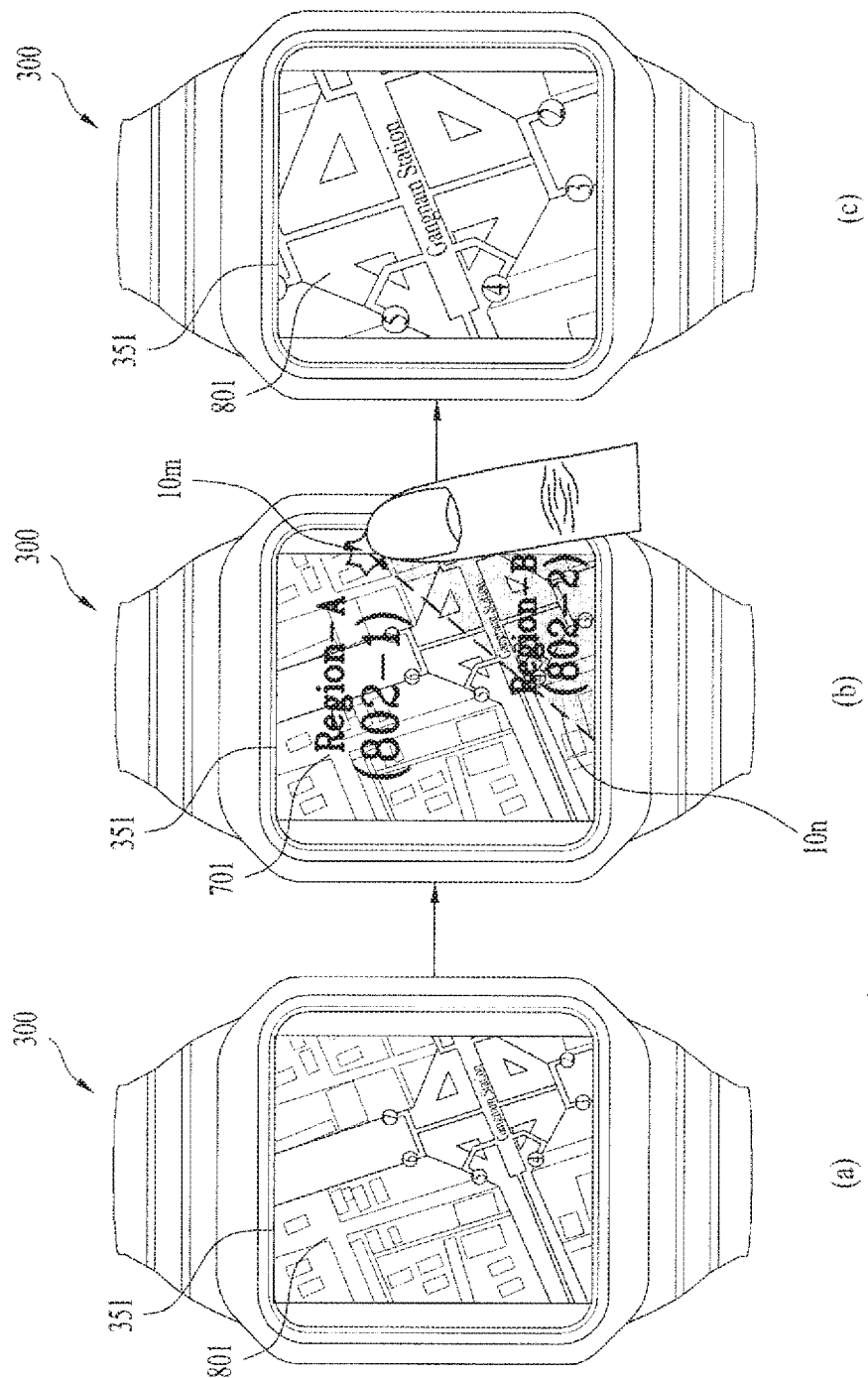
FIG. 8 is a diagram of a controlling method for enlarging and outputting map data in response to a touch drag input according to one embodiment of the present invention.

FIG. 8 is a diagram of a controlling method for enlarging and outputting map data in response to a touch drag input according to one embodiment of the present invention.

Referring to FIG. 8 (a), the watch-type mobile terminal 300 is outputting geographical information through a map output object 801 outputted to the touchscreen 351. If a split touch drag 10m and 10n is inputted to the map output object 801, the controller 180 can enlarge and display geographical information corresponding to one of two regions partitioned on the basis of a touch path.

According to the example shown in FIG. 8 (b), a region-A 802-1 and a region-B 802-2 are partitioned by the split touch drag 10m and 10n. Subsequently, as shown in FIG. 8 (c), the controller 180 enlarges and displays the geographical information corresponding to a smaller one (i.e., region-B 802-2) of the region-A 802-1 and the region-B 802-2. In this case, the controller 180 can determine an enlargement ratio based on a size ratio of the region-A 802-1 to the region-B 802-2. In particular, if the size ratio of the region-A 802-1 to the region-B 802-2 is 3:1, the controller 180 can display the geographical information corresponding to the region-B 802-2 by enlarging it by three times.

Alternatively, the controller 180 may determine the enlargement ratio based on the touch path. Such an embodiment is described with reference to FIG. 9.

Figure 9:
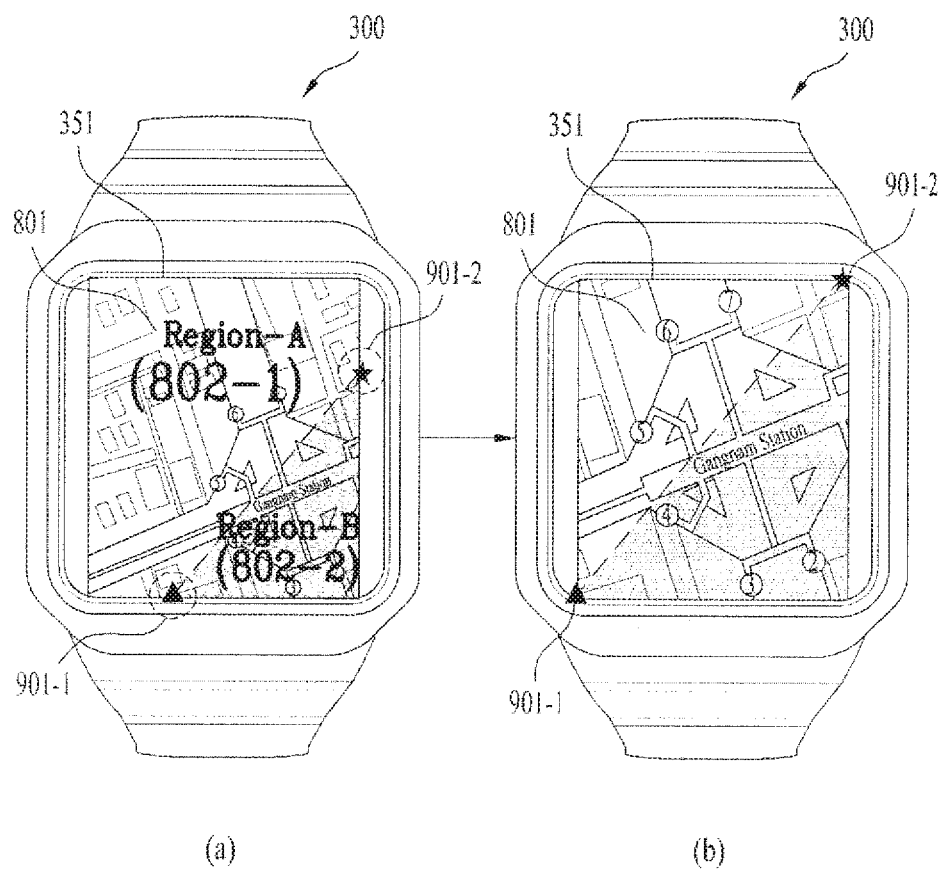
FIG. 9 is a diagram of a controlling method for determining an enlargement ratio of data based on a touch path of a touch drag input according to one embodiment of the present invention.

FIG. 9 is a diagram of a controlling method for determining an enlargement ratio of data based on a touch path of a touch drag input according to one embodiment of the present invention.

Referring to FIG. 9 (a), a map output object 801 is currently displayed like FIG. 8. And, assume that the same split touch drag 10m and 10n as shown in FIG. 8 is received. According to one embodiment of the present invention, it is proposed that an enlargement ratio is determined based on a start point 901-1 and an end point 901-2 of a touch path on the map output object 801.

In particular, the controller 180 can perform enlargement by determining an enlargement ratio in a manner that the start and end points 901-1 and 901-2 are located at corners (e.g., corners in diagonal direction) of the map output object 801, respectively [refer to FIG. 9 (b)].

It will be appreciated by those skilled in the art that the present invention can be specified into other form(s) without departing from the spirit or scope of the inventions.

The present invention mentioned in the foregoing description can be implemented in a program recorded medium as computer-readable codes. The computer-readable media may include all kinds of recording devices in which data readable by a computer system are stored. The computer-readable media may include ROM, RAM, CD-ROM, magnetic tapes, floppy discs, optical data storage devices, and the like for example and also include carrier-wave type implementations (e.g., transmission via Internet). Further, the computer may include the controller 180 of the terminal.

Thus, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A mobile terminal, comprising:
a touchscreen configured to sense a touch drag input; and
a controller configured to control the touchscreen to output a display object,
wherein when the sensed touch drag input is a split touch drag partitioning the outputted display object into two regions, the controller is further configured to perform a prescribed function corresponding to the split touch drag,
wherein the display object comprises a data output object configured to output prescribed data,
wherein the prescribed function comprises a function of enlarging and outputting partial data selected from the outputted prescribed data,
wherein the split touch drag is initiated at a start point of the touchscreen and finished at an end point of the touchscreen such that the display object is partitioned into the two regions with reference to a touch path between the start point and the end point, and
wherein the partial data is enlarged in response to the split touch drag such that the start and end points are relocated to corners of the enlarged partial data output on the touchscreen.

2. The mobile terminal of claim 1, wherein an enlargement ratio of the enlargement of the partial data is determined based on the start point and the end point of the touch path.

3. The mobile terminal of claim 1, wherein the corners are in a diagonal direction.

4. The mobile terminal of claim 1, wherein the partial data is not enlarged when the sensed touch drag input is not the split touch drag.

5. A method of controlling a mobile terminal, the method comprising:
sensing a touch drag input;
controlling a touchscreen to output a display object; and
when the sensed touch drag input is a split touch drag partitioning the outputted display object into two regions, performing a prescribed function corresponding to the split touch drag,
wherein the display object comprises a data output object configured to output prescribed data,
wherein the prescribed function comprises a function of enlarging and outputting partial data selected from the outputted prescribed data, and
wherein the partial data is enlarged in response to the split touch drag such that the start and end points of the split touch drag are relocated to corners of the enlarged partial data output on the touchscreen.

6. The method of claim 5, wherein an enlargement ratio of the enlargement of the partial data is determined based on the start point and the end point of the touch path.

7. The method of claim 5, wherein the corners are in a diagonal direction.

8. The method of claim 5, wherein the partial data is not enlarged when the sensed touch drag input is not the split touch drag.

* * * * *